United States Patent
Kom et al.

(10) Patent No.: US 12,504,707 B2
(45) Date of Patent: Dec. 23, 2025

(54) IDENTIFYING COMPUTING DEVICES IN A DATA CENTER

(71) Applicant: Core Scientific Operating Company, Austin, TX (US)

(72) Inventors: Lawrence Kom, Redmond, WA (US); Thomas Middleton Rutledge Fuller, Seattle, WA (US)

(73) Assignee: Core Scientific, Inc., Austin, TX (US)

( * ) Notice: Subject to any disclaimer, the term of this patent is extended or adjusted under 35 U.S.C. 154(b) by 146 days.

(21) Appl. No.: 18/286,988

(22) PCT Filed: Feb. 28, 2022

(86) PCT No.: PCT/US2022/018163
§ 371 (c)(1),
(2) Date: Oct. 13, 2023

(87) PCT Pub. No.: WO2022/187147
PCT Pub. Date: Sep. 9, 2022

(65) Prior Publication Data
US 2024/0192753 A1 Jun. 13, 2024

Related U.S. Application Data

(60) Provisional application No. 63/155,091, filed on Mar. 1, 2021.

(51) Int. Cl.
*G06F 1/00* (2006.01)
*G03G 15/00* (2006.01)
*G06F 1/28* (2006.01)
*G06F 1/30* (2006.01)
*G06F 11/30* (2006.01)

(52) U.S. Cl.
CPC ............... *G03G 15/80* (2013.01); *G06F 1/28* (2013.01); *G06F 1/305* (2013.01)

(58) Field of Classification Search
CPC ...... G03G 15/80; G03G 15/5004; G06F 1/28; G06F 1/305
See application file for complete search history.

(56) References Cited

U.S. PATENT DOCUMENTS 10,783,410 B1 9/2020 Hullander
2008/0317021 A1 12/2008 Ives
(Continued)

OTHER PUBLICATIONS

Liu et al. "Machine Learning for the Detection and Identification of Internet of Things Devices: A Survey" IEEE Internet of Things, Journal 9.1, 2021: 298-320 Jan. 5, 2021.

*Primary Examiner* — Xuxing Chen
(74) *Attorney, Agent, or Firm* — Fishman Stewart PLLC

(57) ABSTRACT

System and methods for managing large numbers of network-enabled devices such as computing devices in a facility such as a data center are disclosed. A management application selects and instructs one of the devices to enter a low power state. The power draw from outlets in a power distribution unit supplying the devices are monitored, and an outlet that is detected as dropping below a predetermined threshold of power usage is then mapped to the selected device. This process is repeated for other devices. This permits the power outlet and device associate to be automatically verified to ensure accurate device location identification and power-based billing for the devices in a facility.

20 Claims, 4 Drawing Sheets

(56) References Cited

U.S. PATENT DOCUMENTS

| | | |
|---|---|---|
| 2009/0017816 A1 | 1/2009 | Chainer |
| 2011/0072289 A1* | 3/2011 | Kato .................. G06F 1/26 |
| | | 713/340 |
| 2011/0239010 A1* | 9/2011 | Jain ................ G06F 1/3209 |
| | | 713/310 |
| 2015/0215592 A1* | 7/2015 | Tone .................. H04N 9/3155 |
| | | 348/744 |
| 2016/0124477 A1* | 5/2016 | Guy .............. H04L 12/40045 |
| | | 713/300 |
| 2016/0224272 A1* | 8/2016 | Kim .................. G11C 11/4093 |
| 2016/0328010 A1* | 11/2016 | Cochran ................ G06F 1/26 |
| 2017/0117940 A1 | 4/2017 | Cafe |
| 2019/0121410 A1* | 4/2019 | Chan .................. H04L 12/12 |
| 2021/0012086 A1* | 1/2021 | Zhu .................. G06V 10/25 |

* cited by examiner

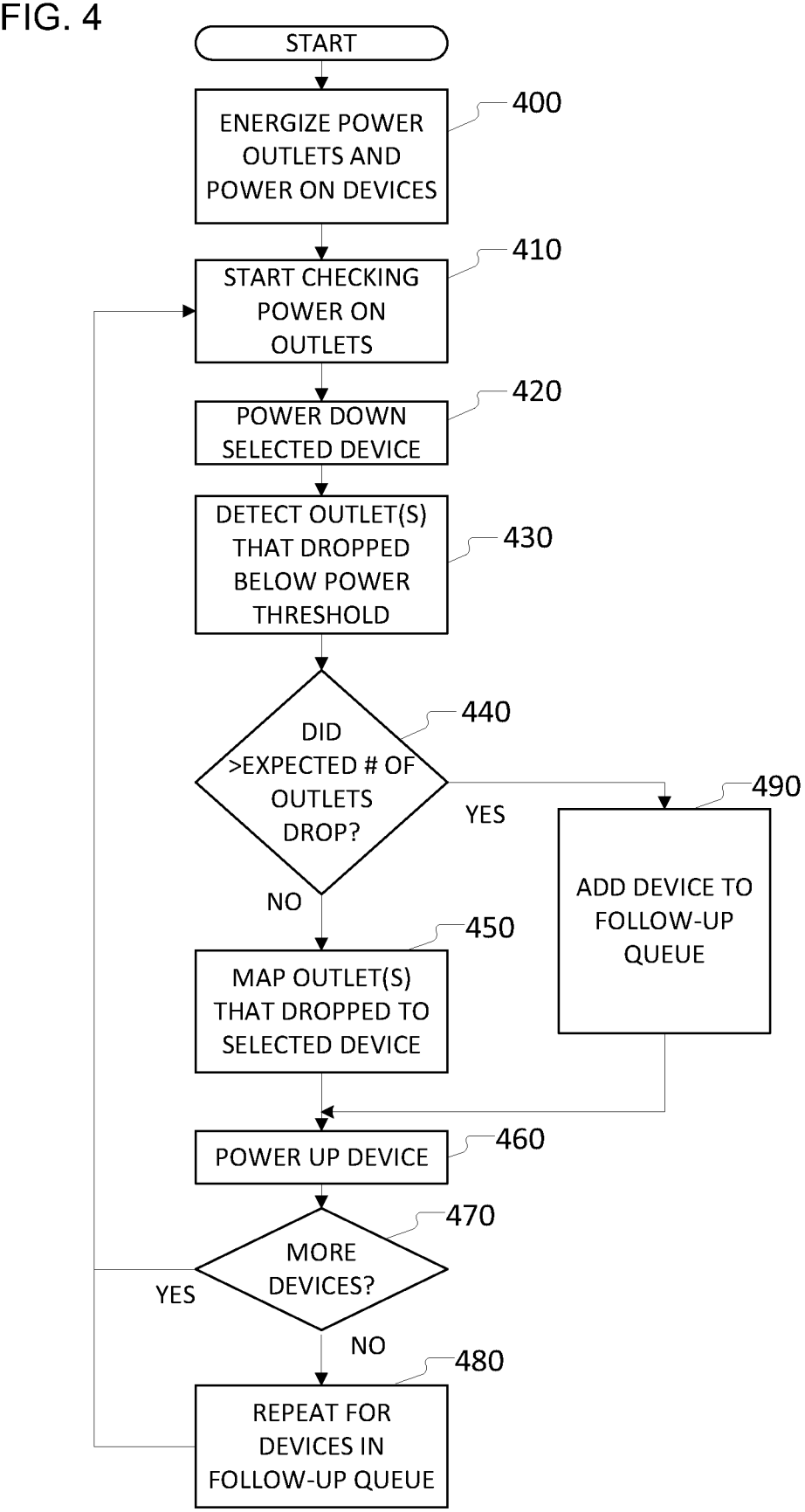

IDENTIFYING COMPUTING DEVICES IN A DATA CENTER

CROSS-REFERENCE TO RELATED APPLICATION

This application claims the benefit of and priority to U.S. Provisional Patent Application Ser. No. 63/155,091, filed on Mar. 1, 2021, the disclosure of which is hereby incorporated by reference in its entirety as though fully set forth herein.

TECHNICAL FIELD

The present disclosure generally relates to the field of computing and, more particularly, to identifying large numbers of computing devices in a facility such as in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many large computing facilities (e.g., data centers) house large numbers of computing devices such as general purpose servers (e.g., for web hosting, email, etc.) or more specialized computing devices (e.g., cryptocurrency miners, high performance computers for data mining, artificial intelligence or machine learning). A large number of these computing devices (e.g., 100's, 1000's, 10,000's, or more) can be housed in a single facility.

Managing such large numbers of computing devices can be difficult. Once installed into their location (e.g., in racks within a data center), the computing devices may need periodic servicing. For example, constant operation at high temperatures often leads to component failures such as worn-out fan bearings or failed chips. These failures require service personnel to physically locate the particular devices with the failed components (amongst racks with thousands of devices) in order to service the device and replace the failed components. In very large data centers, there can be significant numbers of units failing each day, both for known and unknown reasons.

Servicing may involve a data center technician physically moving through the data center's racks, removing a number of failed units, bringing them to a repair room, effecting a repair, and then returning them back to the racks. This may be repeated multiple times per day or week. For facilities providing colocation services, computing devices owned by customers may also need to be removed and shipped to customers and replaced with new devices from the same or different customers. This churn of computing devices being added and removed can cause mistakes to happen, either during initial setup or during a later move or repair, where some devices get swapped or misplaced and end up in the wrong rack position. These mistakes can make identifying where all computing devices are located within large facilities (e.g., for audit purposes) difficult. In some co-location facilities, customers are billed for power consumed by their computing devices. This makes knowing which position on a rack and power outlet of a power distribution unit (PDU) the device is connected to of particular importance. Network-enabled PDUs can be used to report power usage for each outlet, thereby enabling accurate automatic billing for power consumption if the location of the computing is correctly identified in the facility's management system.

One traditional solution to identifying computing devices in the wrong location is for physical asset identifier tags or stickers to be placed on each computing device brought into the facility, and for the data center technicians to perform periodic visual audits of which computing devices are in each rack position and connected to each power outlet. Bar codes can be included on the stickers to speed up the data entry and auditing process, but even with these improvements the manual process is still a time intensive process for large facilities. Some facilities may also maintain switch-level device location maps to assist data center staff in locating devices based on their network ports.

Unfortunately, these manual techniques do not guarantee easy and accurate identification of computing device locations for power-based billing. For example, computing devices may be in the correct physical rack position, but the power supply cables may be swapped in a way that is not easily visible. Asset tags or stickers may fall off or be placed on the wrong device when large numbers of computing devices are received from multiple customers at the same time. Furthermore, reliance on network port mapping may become meaningless in facilities that move to wireless networking.

For at least these reasons, there is a desire for a solution to allow for improved management of large numbers of computing devices in a data center.

SUMMARY

A system and method for more easily mapping a plurality of network-enabled devices is contemplated.

In one embodiment, the devices are each connected to a network and to one or more different outlets on a power distribution unit. The network-enabled devices are powered up and operated, and the power draw for the outlets is monitored. A low power instruction is sent to a selected one of the network-enabled devices, and any outlets that had their power draw drop below a predetermined threshold are detected. The detected outlets are mapped to the selected network-enabled device. The process may be repeated for the other network-enabled devices to complete the map.

In some embodiments, the low power instruction may for example be a hibernate instruction, a power down instruction, a sleep instruction, or a reset instruction. The predetermined threshold may for example be slightly above zero, slightly above the powered-down power draw of one of the network-enabled devices, slightly above the sleep-state power draw for one of the network-enabled devices or at least slightly below the normal power-on state power draw for the device. For example, in some embodiments the predetermined threshold may correspond to the drop in power usage displayed by one of the network-enabled devices going through a reset operation. In some embodiments, the predetermined threshold may be a pattern corresponding to a varying power draw from one of the network-enabled devices in a particular state. Each network-enabled device may be connected to one, two or more different outlets on the power distribution unit. A power-up instruction (e.g., power on, reset, resume normal power state) may be sent to the selected network-enabled device.

In response to detecting more than a predetermined number of outlets having power draws drop below than the predetermined threshold, the selected network-enabled device (and optionally the outlets) may be added to a follow-up queue. The process may then be repeated for the devices in the follow-up queue one or more times.

In another embodiment, the outlets in the power distribution unit are energized and the network-enabled devices are powered on and allowed to operate normally. A selected one of the outlets is powered down (e.g., by sending a power outlet off instruction to the power distribution unit), and the status of the network-enabled devices is monitored via the network. In response to detecting that one of the network-enabled devices has stopped responding, the non-responding network-enabled device is mapped to the powered off outlet. This process may be repeated for the other outlets. If more than one of the network-enabled devices stopped responding, the powered off outlet (and optionally the non-responding devices) may be added to a follow-up queue; and the process may be repeated one or more times for the outlets in the follow-up queue. In response to determining that none of the network-enabled devices stopped responding, the selected outlet may be tagged as empty or potentially empty. The outlet may also be reenergized before or after the next outlet is being checked. The powered down outlets may be reenergized in a staggered pattern to avoid exceeding a predetermined maximum current draw. The mapping process may be configured to be automatically repeated on a periodic basis (e.g., according to a predetermined schedule).

The method may be implemented by instructions stored on a non-transitory, computer-readable storage medium that may be executable by a processor of a computational device.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 4 is a flowchart of another example embodiment of a method for identifying computing devices in a data center according to the teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
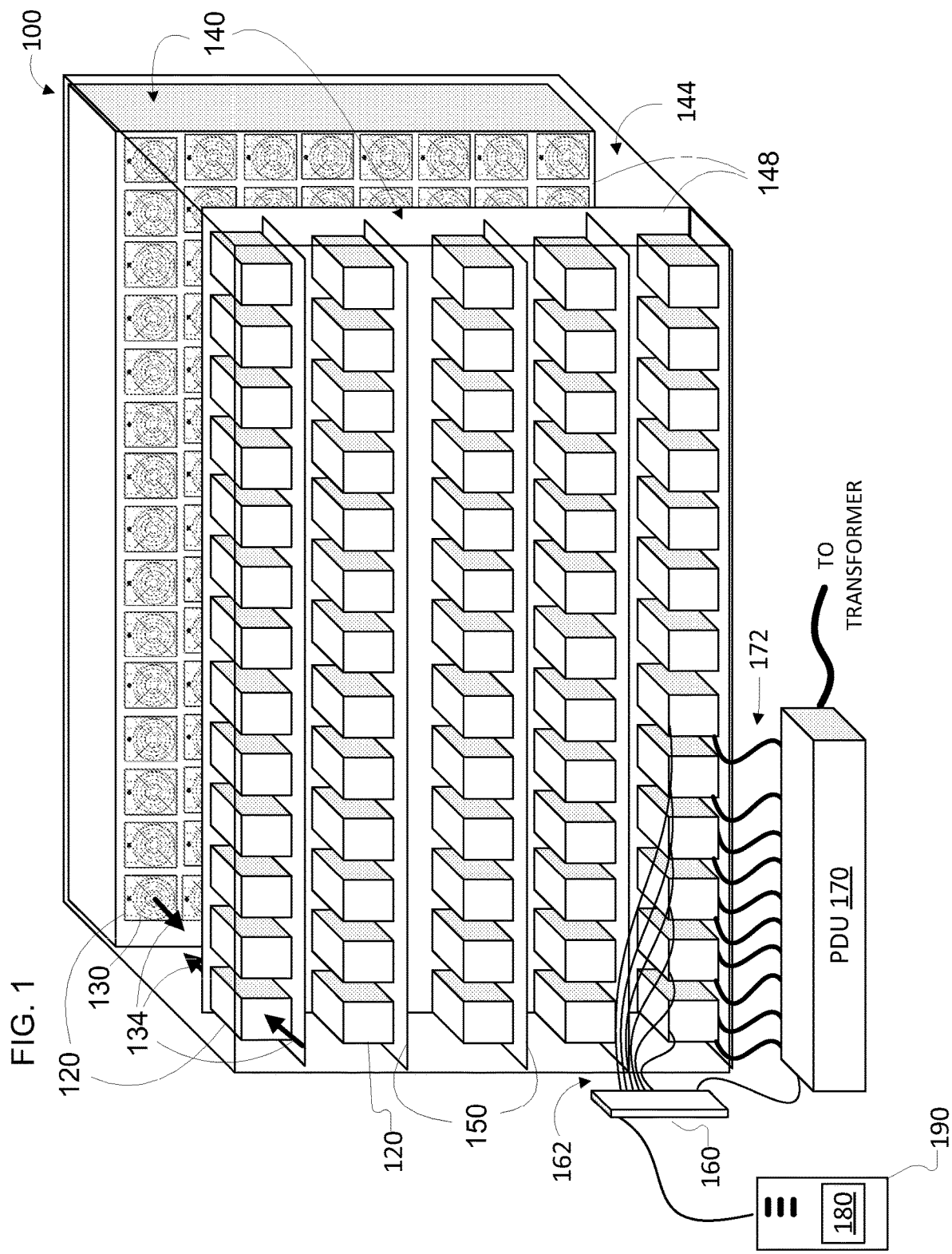
FIG. 1 is an illustration of one example embodiment of a section of racks holding computing devices in a facility such as a data center according to the teachings of the present disclosure.

Turning now to FIG. 1, an illustration of one example embodiment of a system 100 for managing network-enabled computing devices in a facility such as a data center according to the teachings of the present disclosure is shown. In this embodiment, a plurality of network-enabled devices 120 (e.g., computing devices such as cryptocurrency miners, servers, Internet-of-Things (IoT) devices, network-enabled cameras, PCs, computing appliances, etc.) are positioned on a plurality of shelves 150 within racks 140. The network-enabled devices 120 may be affixed to or placed on shelves 150 and may be oriented in the same direction to improve cooling as shown in the illustration. For example, network-enabled devices 120 may have one or more fans 130 that are configured to draw in cool air from one side of the rack (often called a cold aisle) and exhaust hot air to the other side as shown by arrows 134. With all network-enabled devices 120 exhausting hot air in the same direction, the hot exhaust air can be kept within the space 144 between the racks 140 (often called a hot aisle) and then exhausted in a controlled manner (e.g. via ceiling vents) to prevent the hot air from being drawn back into the network-enabled devices 120, which could reduce cooling efficiency. Racks 140 may have air barriers 148 to prevent the hot air from escaping from the hot aisle back to the cold aisle.

In this embodiment, the network-enabled devices 120 may be connected to a network 162 (e.g., via Ethernet cables) via a network switch 160. Other types of network connections are possible and contemplated, for example, wireless or fiber optic network interconnections may also be used. Network switch 160 may be connected to an internal network, for example a local area network, and or an external network, e.g., the Internet. Network-enabled devices 120 may be configured to receive work or tasks to be performed and output results via the network. Network-enabled devices 120 may also be configured to receive control instructions via the network, for example instructions to reboot, power up, power down, hibernate, or enter low power or sleep mode. Network-enabled devices 120 may also be configured to report status data via the network, for example either in a push mode where the device is configured to periodically send status data, or in a pull mode where the network-enabled device responds to status inquiry instructions received via the network.

Network-enabled devices 120 may receive work tasks and control instructions from a management computer 190. In this embodiment, management computer 190 may be connected to the same network 162 as network-enabled devices 120, e.g., via network switch 160. Management computer 190 may be configured to execute a management application 180 that may be configured to receive work items (e.g., from an external source) and distribute the work items amongst the network-enabled devices 120. Management application 180 may also be configured to perform management functions such as tracking the power consumption of the network-enabled devices 120 through the power distribution unit 170 for billing purposes. Management application 180 may also be configured to assist users such as data center technicians in identifying the location of network-enabled devices 120 within the facility.

In this embodiment, network-enabled devices 120 may be connected to power distribution unit 170 via one or more power cables 172. For example, in some embodiments network-enabled devices 120 may each have one power cable, but in other embodiments they may have two or more power cables to receive power from the power distribution unit 170. For example, if the network-enabled device 120 is a high-power cryptocurrency miner, it may have two power cables due to the amount of power that it draws from the power distribution unit 170. Power distribution unit 170 may for example receive power from a transformer or directly from the mains or utility grid. Power distribution unit 170 may be controllable remotely (e.g., via ethernet, Wi-Fi, USB, Bluetooth, or other network protocol) and may be configured to receive instructions to power on or off a particular outlet or outlets. The power distribution unit 170 may also be configured to report power usage data (e.g., current draw, voltage, power in watts, etc.) for its outlets. For example, power distribution unit 170 may be configured to respond to periodic power usage queries from management application 180.

Management computer 190 may be a traditional PC, a server (virtualized or physical), a specialized appliance, or even a mobile device. Management computer 190 may be configured with one or more processors, volatile memory and non-volatile memory such as flash storage or internal or external hard disk (e.g., network attached storage).

Management application 180 is preferably implemented in software (e.g., instructions stored on a non-volatile storage medium such as a hard disk, flash drive, or DVD-ROM), but hardware implementations are possible. Software implementations of management application 180 may be written in one or more programming languages or combinations thereof, including low-level or high-level languages, with examples including Java, Ruby, JavaScript, Python, C, C++, C #, or Rust. The program code may execute entirely on the management computer 190, partly on the management computer 190 and partly on a user's computer or device, or partly on a remote computer or server, or management computer 190 may be entirely remote.

Figure 2:
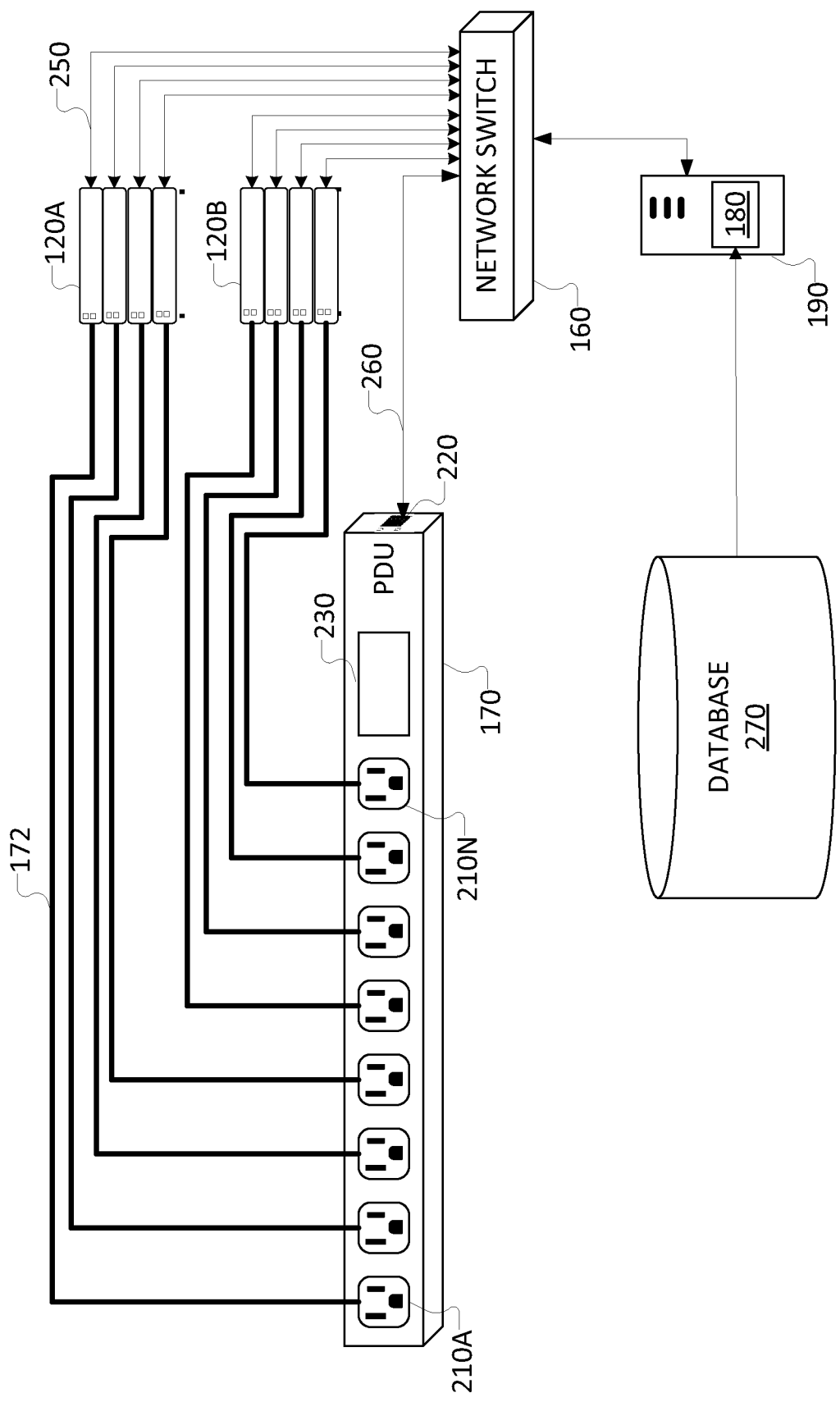
FIG. 2 is a diagram of one example embodiment of a system for identifying computing devices in a facility such as a data center according to the teachings of the present disclosure.

Turning now to FIG. 2, an illustration of one example embodiment of a system for identifying computing devices in a facility such as a data center according to the teachings of the present disclosure is shown. In this embodiment, power distribution unit 170 has a plurality of outlets 210A through 210N that provide power to network-enabled devices 120A-B (in this example computing devices such as servers in a data center) via power cables 172. Power distribution unit 170 may also have a controller 230 and a network interface 220 (e.g., connected to network switch via network connection 260).

In other embodiments, power distribution unit 170 may bypass network switch 160 and be directly connected to management computer 190 for example via a USB or wireless network connection. The controller 230 may be configured to receive instructions from network interface 220 and power on or off selected outlets 210A-N. Controller 2:30 may also be configured to provide power draw data for one or more of outlets 210A-N (e.g. in response to power consumption queries received via network interface 220). The power consumption (e.g., draw) may be provided for example in watts or in current (e.g., amps).

In the embodiment illustrated, network-enabled devices 120A-B are connected to network switch 160 via a set of network connections 250. Management computer 190 may also be connected to network switch 160. In this embodiment, management computer 190 is configured to execute management application 180 which communicates with database 270. Database 270 may be configured to store power draw information received by management application 180 or management computer 190 from power distribution unit 170. Management application 180 may also be configured to store mapping information such as location information regarding network-enabled devices 120A through 120 B in database 270. This stored information may for example be useful for billing and audit purposes.

In one embodiment, the management application 180 may be configured to monitor the power output of outlets 210A-N during normal operation. The management application 180 may then select one of computing devices 120A-N and send it an enter low power state instruction (e.g., sleep, reset, hibernate, enter low power mode, suspend computation, halt, etc.). After allowing enough time for the selected device to power down into the designated low power state, the management application 180 may be configured to query the power distribution unit 170 for the power consumption of each outlet 210A-N. When the management application detects an outlet that has dropped power consumption to a level below a predetermined threshold (e.g., below the power draw of the network-enabled device in normal operation), if that is the only outlet to drop, that outlet is then associated with the device that was powered down. This information may then be stored in the database 270 by the management application 180. The device may then be powered up, and another device may be selected and sent a power down instruction. By power cycling the network-enabled devices and monitoring the power consumption (e.g., current draw or wattage) of the outlets in power distribution unit 170, a mapping may be created of devices to outlets. This may enable more accurate power-based billing and also assist in identifying devices that have been installed in the wrong location within the facility. Management application 180 may be configured to periodically perform this power-cycling and power monitoring automatically for large numbers of network-enabled devices in one or more facilities. In some embodiments, many devices (e.g., 100's or 1000's) may be automatically power-cycled and identified without manual intervention. This may be performed serially or in parallel (e.g., with one device on two or more power distribution units being instructed to enter low power mode at the same time). In some embodiments, this process may be performed periodically as part of a regular audit process (e.g., once a week, once a month, etc.), and this process may be scheduled to occur when workloads for the devices are lowest, or when temperatures at the facility are highest (e.g., late afternoon during summer months).

Figure 3:
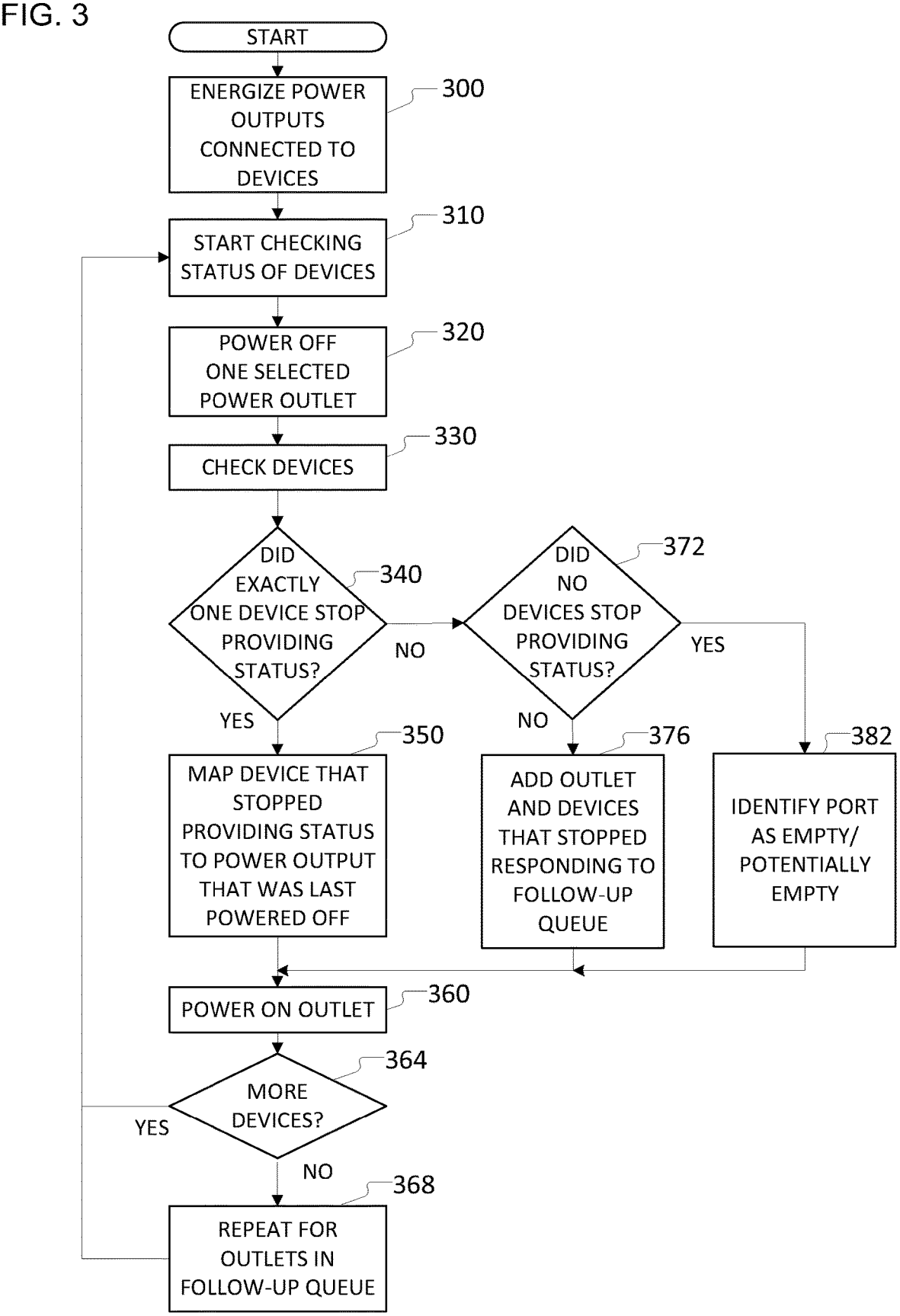
FIG. 3 is a flowchart of one example embodiment of a method for identifying computing devices in a data center according to the teachings of the present disclosure.

Turning now to FIG. 3, a flowchart of one example embodiment of a method for identifying network-enabled devices is shown. The power outputs of a power distribution unit connected to the network-enabled devices are energized, and the devices are started (step 300). The status of the devices are monitored (step 310), e.g., by monitoring network traffic from the devices, by monitoring the work they perform, or by sending them status inquiries. One power outlet on the power distribution unit is selected and powered off (step 320), and the network-enabled devices are checked to determine which one(s) stopped providing status or responding to status inquiries (step 330). If exactly one device stopped responding (step 340), that device is mapped to the power outlet that was powered off (step 350). The outlet may be powered back on (step 360), and the process may be repeated for additional devices (step 364), e.g., until all devices are mapped.

If no devices stopped responding when an outlet is powered off (step 372), the outlet may be identified or mapped as an empty or potentially empty outlet (step 382). A support ticket may be created at the end of the process for data center technicians to check that the outlets identified as empty or potentially empty are in fact empty (or perhaps a dead device is connected to it). If more than one device stopped providing status (step 372), another device may have crashed or entered a non-responsive state at the same time as the power off instruction was sent to the power distribution unit. The outlet (and optionally the non-responding devices) may be added to a follow-up queue (step 376). The outlets on the follow-up queue may be retested (step 368), for example once the other outlets not on the follow-up queue have been cycled through. If the retesting is unsuccessful, the remaining outlets and devices on the follow-up queue may be provided in a support ticket to data center technicians for manual follow-up.

Turning now to FIG. 4, a flowchart of another example embodiment of a method for identifying network-enabled devices is shown. In this embodiment, a power down instruction (or other low power instruction) is sent to the network-enabled device instead of the power distribution unit as in the embodiment of the previous figure. In this embodiment, the power outputs of a power distribution unit are connected to the network-enabled devices and energized, and the devices are started (step 400). The power consumption of the outlets on the power distribution unit are monitored (step 410). One of the network-enabled device is selected and instructed to enter a low power state (step 420), and after a wait time to permit the device to enter the low power state, the power draw from the network-enabled power distribution units is monitored to detect any outlets that dropped in power consumption below a defined "in use" power threshold (step 430). The threshold may for example be at least slightly above the power used by a network-enabled device in the off (but still network-connected) state. Some network-enabled devices may also continue operate their cooling fans for example while in lower power state (either constantly or for a predetermined cooling period or until a predetermined temperature is reached). In other embodiments the threshold may be slightly above the power used by the device in a sleep or other low power mode. The threshold may be selected according to the type of network-enabled device and the type of power-down instruction being sent to that device (e.g. sleep, hibernate, power off). The threshold may also be selected based on the power usage of the device in normal operation (e.g., at least slightly below the lowest normal power usage). In some embodiments where the resolution of the power outlet monitoring in the power distribution unit is high enough, a reset instruction may be sent as the low power instruction, and monitoring may be performed to catch any temporary drops in power consumption corresponding to a device reset.

Some network-enabled devices may have a time-varying power draw in low power mode (e.g., they draw 1 watt for 30 second, then 10 watts for 10 second in a repeating pattern). For example, the device may periodically energize its network interface while in sleep mode to maintain network connectivity. The predetermined threshold may be a signature based on that pattern.

If exactly the expected number of outlets experienced the expected drop, e.g., one outlet for embodiments where the network-enabled devices each have a single power connection to a single power distribution unit outlet, two outlets for embodiments where the network-enabled devices each have two power connections, etc., (step 440) the outlet or outlets that experienced the drop in power are mapped to the network-enabled device that received the power down instruction (step 450). The device is then powered back up (step 460), e.g., resuming normal operation, and the process is repeated for additional unmapped devices, if any (step 470). If more than the expected number of outlets experienced a drop in power (step 440), then another device may have happened to experience a drop in power (e.g., system crash, entering sleep mode) during the same time window as the selected device. For this reason, the selected device may be added to a follow-up queue (step 490) that is later revisited (step 480), and the same process may be repeated until all devices are successfully mapped. In some embodiments, after a predetermined number of unsuccessful attempts the unmapped devices in the follow-up queue may be flagged for manual troubleshooting by data center technicians by creating a support ticket.

In some embodiments, a standard or "dumb" power distribution unit may be used along with smart add-on power or current sensors connected to each outlet that report power usage or current draw to the management application.

In some embodiments, a database of power distribution units and their physical location in the facility may be created, and that data may be paired with the mapping data the management application collects to create a more accurate map of where each of the network-enabled devices are located in the facility. In some embodiments, multiple outlets on different power distribution units and or network-enabled devices connected to those power distribution units may be cycled into and out of low power mode in parallel, thereby permitting large numbers of devices to be quickly mapped.

In some embodiments, the power distribution units may not have outlet-based measurement ability, instead measuring power draw for a bank of multiple outlets (e.g., for outlets on once phase of a three-phase system). In these embodiments, a bank of outlets may be powered down instead of a single outlet. The banked-based measurement may then be used to isolate which bank a unit is attached to, rather than which outlet. This may still help data center staff determine the location of the network-enabled device down to a few outlets.

In some embodiments, once the devices on a particular bank have been identified, the power draw of units on the bank may be modulated in a predetermined pattern by sending them low power instructions in a particular pattern. By monitoring the difference in power draw for the bank when all devices are in a first state (e.g., full power mode) and the power draw for the bank as each device is individually placed into a second state (e.g., low power mode), a power draw for each individual device may be estimated. This may be automatically performed periodically for power-based billing purposes and for diagnostic purposes. For example, if a device's estimated power draw is suddenly dramatically different, it may signal an impeding device failure, and a support ticket may be created to have the device preventatively serviced.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for mapping a plurality of network-enabled devices each connected to a network and to one or more different outlets on a power distribution unit, the method comprising:
    (a) powering on the plurality of network-enabled devices;
    (b) monitoring a power draw for each of the one or more different outlets;
    (c) sending a low power instruction to a selected one of the network-enabled devices;
    (d) detecting outlets that have power draws that drop below a predetermined threshold;
    (e) mapping the detected outlets to the selected network-enabled device;
    (f) repeating (b)-(f) for each of the network-enabled devices; and
    in response to detecting more than a predetermined number of outlets having power draws that drop below the predetermined threshold, adding the selected network-enabled device to a follow-up queue.

2. The method of claim 1, wherein the low power instruction is a reset instruction.

3. The method of claim 1, wherein the low power instruction is a power down instruction.

4. The method of claim 2, wherein the predetermined threshold is above zero and below a normal power-on state power draw for the selected network-enabled device.

5. The method of claim 2, wherein the predetermined threshold is slightly above a powered-down power draw of one of the network-enabled devices.

6. The method of claim 1, wherein the low power instruction is a sleep instruction.

7. The method of claim 2, wherein the predetermined threshold is a signature based on a time-varying power draw pattern corresponding to a low power mode power draw of one of the network-enabled devices.

8. The method of claim 1, wherein each network-enabled device of the plurality of network-enabled devices is connected to a different outlet of the one or more different outlets on the power distribution unit.

9. The method of claim 1, wherein each network-enabled device is connected to two different outlets on the power distribution unit.

10. The method of claim 1, further comprising sending a power-up instruction to the selected network-enabled device.

11. The method of claim 1, wherein:
    the outlets are added to the follow-up queue in response to detecting more than the predetermined number of outlets having power draws that drop below the predetermined threshold.

12. The method of claim 1, further comprising:
repeating (b)-(f) for each of the network-enabled devices in the follow-up queue.

13. A method for mapping a plurality of network-enabled devices connected to a power distribution unit, the method comprising:
 (a) energizing a plurality of outlets in the power distribution unit, wherein each of the plurality of network-enabled devices is connected to at least one of the plurality of outlets;
 (b) instructing the power distribution unit to power off an outlet of the plurality of outlets;
 (c) monitoring the plurality of network-enabled devices via a network;
 (d) determining which of the plurality of network-enabled devices stopped responding;
 (e) mapping the non-responding network enabled device to the powered off outlet;
 (f) repeating (b)-(e) for different outlets; and
 in response to determining that more than one of the network-enabled devices stopped responding, adding the plurality of network-enabled devices and the powered off outlet to a follow-up queue.

14. The method of claim 13, further comprising:
repeating (b)-(e) for the outlets in the follow-up queue.

15. The method of claim 13, further comprising:
in response to determining that none of the network-enabled devices stopped responding, tagging the powered off outlet as empty.

16. The method of claim 13, further comprising:
reenergizing the powered off outlet.

17. The method of claim 13, further comprising reenergizing the powered off outlets in a staggered pattern to avoid exceeding a predetermined maximum current draw.

18. The method of claim 13, further comprising periodically repeating (a)-(f) according to a predetermined schedule.

19. The method of claim 18, wherein the predetermined schedule corresponds to times when the temperatures are highest.

20. A non-transitory, computer-readable storage medium storing instructions executable by a processor of a computational device, which when executed cause the computational device to:
 (a) power on the plurality of network-enabled devices;
 (b) monitor a power draw for each of the one or more different outlets;
 (c) send a low power instruction to a selected one of the network-enabled devices;
 (d) detect outlets that have power draws that drop below a predetermined threshold;
 (e) map the detected outlets to the selected network-enabled device;
 (f) repeat (b)-(f) for each of the network-enabled devices; and
 in response to detecting more than a predetermined number of outlets having power draws that drop below the predetermined threshold, add the selected network-enabled device to a follow-up queue.

* * * * *